United States Patent [19]

Bezzi et al.

[11] 4,202,793
[45] May 13, 1980

[54] PRODUCTION OF MICROSPHERES OF THORIUM OXIDE, URANIUM OXIDE AND PLUTONIUM OXIDE AND THEIR MIXTURES CONTAINING CARBON

[75] Inventors: Giovanni Bezzi, Bagnacavallo; Alessandro Facchini, San Donato Milanese; Giovanni Martignani, Bagnacavallo; Michele Pastore, San Donato Milanese, all of Italy

[73] Assignee: Agip Nucleare S.p.A., San Donato Milanese, Italy

[21] Appl. No.: 812,336

[22] Filed: Jul. 1, 1977

Related U.S. Application Data

[63] Continuation of Ser. No. 518,191, Oct. 25, 1974, abandoned.

[30] Foreign Application Priority Data

Oct. 26, 1973 [IT] Italy ............................ 30598 A/73

[51] Int. Cl.² .......................... C09K 3/00; G21G 4/04
[52] U.S. Cl. ............................... 252/301.1 S; 264/0.5
[58] Field of Search ................. 252/301.1 R, 301.1 S; 264/0.5; 423/251, 252, 256

[56] References Cited
U.S. PATENT DOCUMENTS

| | | | |
|---|---|---|---|
| 3,301,790 | 1/1967 | Fitch et al. | 252/301.1 S |
| 3,535,264 | 10/1970 | Hackstein et al. | 264/0.5 |
| 3,845,178 | 10/1974 | Hrovat et al. | 264/0.5 |
| 3,860,691 | 1/1975 | Gens | 252/301.1 S |
| 3,880,769 | 4/1975 | Googin et al. | 423/256 |
| 3,888,787 | 6/1975 | Heil et al. | 423/256 |

*Primary Examiner*—Edward A. Miller

*Attorney, Agent, or Firm*—Morgan, Finnegan, Pine, Foley & Lee

[57] ABSTRACT

A process for the production of microspheres of thorium oxide, uranium oxide or plutonium oxide and mixtures thereof, containing carbon. The microspheres are prepared by first forming an aqueous alkaline solution of a salt of said metals which will precipitate to a solid form in a concentrated alkaline medium together with an alkaline polymerizable organic monomer and carbon, thereafter dripping this solution into a concentrated alkaline medium wherein metal hydroxide is precipitated out and said monomers polymerized to thereby form said microspheres. The precipitated metal compounds with polymerized monomer and carbon are washed to remove unwanted ions and dried by various methods such as air currents, infrared lamps, high frequency microwaves or preferably by azeotropic distillation whereby the washed particles are dispersed in an organic liquid immiscible with water which is then boiled off. Simple liquids include 1,1,1-trichloroethane, carbontetrachloride and xylene. The particles are then subjected to thermal treatments which vary according to the particular composition and the properties required in the final product. The microspheres obtained according to the process of the invention possess excellent properties of high density, good homogeneity, and high tensile strength and are useful as fuel for high temperature gas-cooled nuclear reactors.

In a preferred embodiment, uranyl nitrate is mixed with acrolein in dilute ammonia solution to which carbon is added and the solution dripped into a concentrated alkaline medium, and the microspheres thereby formed washed with water, dried by azeotropic distillation with an organic liquid, and thermally cycled.

5 Claims, No Drawings

PRODUCTION OF MICROSPHERES OF THORIUM OXIDE, URANIUM OXIDE AND PLUTONIUM OXIDE AND THEIR MIXTURES CONTAINING CARBON

This is a continuation of application Ser. No. 518,191 filed Oct. 25, 1974, and now abandoned.

BACKGROUND OF THE INVENTION

1. Field of the Invention

The object of the present invention is a process for the production of microspheres of thorium, uranium, and plutonium oxides, and their mixtures, containing carbon, prepared through the addition to the starting solution, of a polymerizing organic substance, under alkaline conditions.

Microspheres of thorium, uranium or plutonium oxides and their mixtures containing carbon are used either as fuel for high temperature gas cooled nuclear reactors, or for the preparation of carbide microspheres which in turn are used in reactors of the type mentioned or of a different type.

In the first case, the microspheres of thorium, uranium and plutonium oxides containing carbon are used. In the second case, the microspheres are subjected to thermal treatment to cause carburization of the oxides.

In both cases, it is desirable that the carbon is distributed in the most homogeneous way possible and that the microspheres have good compactness and solidity.

2. Prior Art

By making use of the production method of microspheres indicated in the Italian patents of Snamprogetti S.p.A. No. 727.301 and No. 778.786, microspheres of thorium, uranium and plutonium oxides containing carbon may be obtained by adding finely divided carbon to the starting solution. For example, the method described in the Italian patents mentioned may be used by dispersing finely divided carbon (carbon black) in the solutions of the uranium salts (for example uranyl nitrate) and of thorium and of plutonium together with a polymer soluble in $H_2O$, by dripping said solutions in aqueous ammonia.

After an aging of the microspheres thus obtained in a solution of ammonium hydrate for about 2 hours, the microspheres are subjected to a fast washing with water to remove the foreign ions, for example the $NH_4+$ and the $NO_3-$, and then dried.

The dried microspheres are subsequently subjected to a thermal treatment at high temperature.

Since the microspheres thus obtained, depending upon the content of carbon, may present soft, brittle or a low abrasion resistance, in Italian patent Nr. 933.615 of Agip Nucleare S.p.A., a method for impregnating microspheres obtained as above-mentioned to give them a suitable solidity and compactness was claimed subsequently.

SUMMARY OF THE INVENTION

The object of the present invention is to obtain microspheres of thorium, uranium and plutonium oxides and their mixtures containing carbon with a new process which comprises adding to the solutions of the thorium, uranium and plutonium salts a polymerizable organic substance in an alkaline medium which acts as a carbon source desired during the thermal treatments, after formation of the microspheres.

By making use of the method of the present invention, the starting solution is prepared by adding to a solution of the thorium, uranium and plutonium salts a polymerizing and/or partly pre-polymerized organic substance in alkaline medium as, for example, acrolein, acrylonitrile, solution of styrene in benzene and so on.

These may be used in mixtures among themselves or with co-polymerizing substances or graft co-polymers. If in the starting solution one would use a pre-polymerized and/or partly polymerized substance, it would be obtained by thermal polymerization and/or in acid or alkaline medium. If these substances are not miscible with the aqueous solutions of the thorium, uranium and plutonium salts, a substance such as tetrahydrofurfuryl alcohol, isopropyl alcohol and so on may be added.

Once prepared as above-mentioned, the starting solution is fractionated in spheroidal particles by making use of one of the methods known in the art.

The spheroidal particles may be collected in an alkaline solution and left there for about two hours which is sufficient to complete the precipitation of the hydroxides and/or of the insoluble salts of thorium, uranium, plutonium and to assure a sufficient degree of polymerization of the organic substance added to the starting solution. Alternatively, when the content of thorium, uranium and plutonium is very low, the particles obtained from the starting solution may be collected in a tower column, wherein, a heating gas consisting of ammonia or ammonia in admixture with gas or air is run through in countercurrent flow to the particles.

After the phase of formation of the particles and of precipitation in them of the hydroxides and/or salts of thorium, uranium, plutonium, the microspheres are subjected to washing with water to remove the foreign ions.

The drying of the microspheres may be carried out through various methods, for example: in air current with heating by means of electrical resistances, or with an infrared lamp, or with microwaves at high frequency. These heating methods affect the properties of the finite product and particularly the density and the tensile strength of the microspheres. Another method of drying which may be used is based on azeotropic distillation according to which the washed particles are dispersed in an organic liquid immiscible with water and are kept boiling for a sufficiently long time.

The properties of the final product depend, in this case, on the organic liquid used and particularly on its boiling temperature.

The dried particles are subjected to thermal treatments which may differ according to the composition and the properties required by the final product.

The method of the present invention permits one to obtain microspheres of the named oxides which contain carbon in amounts which may vary from a practically negligible minimum (some parts per million) to a desired maximum.

The microspheres obtained according to the process of the present invention present exceptional characteristics of sphericity, high tensile strength, uniform dispersion of the carbon in the particles and high density.

The uniformity of dispersion at the elementary level of the carbon inside the particle represents a property particularly decisive in obtaining particles with carbides of excellent properties i.e. high density, good homogeneity, high tensile strength, and so on.

Moreover, the carbon may be proportioned at will.

In comparison with the prior art, the process of the present invention is of extremely short duration.

The following examples of the process are merely illustrative of the invention and are not restrictive of the scope of our invention which is defined in the appended claims.

PREFERRED EMBODIMENTS

EXAMPLE 1

Microspheres of $UO_2 + 5$ C.

Preparation of 1 liter of starting solution.

100 cc of 8% (by weight) aqueous ammonia are poured into beaker #1 and are maintained under stirring.

A mixture of 100 cc of acrolein plus 100 cc of furfuryl alcohol, previously prepared in beaker #2, is slowly added to beaker #1. The addition of the mixture is effected in such a way as not to exceed 90° C. due to the exothermic reaction which develops. The stirring is continued until the temperature of the polymeric liquid obtained has reached about 60° C. At this point beaker #1 is cooled with a bath of cold water.

When the temperature of the solution in beaker #1 reaches room temperature, there is poured into it a mixture of 200 cc. of uranyl nitrate (565 gr/l as $UO_2$), 360 cc of tetrahydrofurfuryl alcohol, 70 cc of water, and of 150 cc of Methocel 90 H G 3% by weight prepared in beaker #3.

The starting solution thus prepared then is fractionated into microspheres, by suitable dripping devices into 32% (by weight) aqueous ammonia.

The microspheres are then aged in 32% (by weight) aqueous ammonia, for 2 hours. During this time the reaction of the uranyl nitrate with ammonia is completed to give an insoluble precipitate of ammonium diuranate and the polymerization of the polymer is continued.

After aging, the microspheres are washed with water to remove the foreign ions, and then subjected to drying by means of azeotropic distillation with organic liquids such as 1.1.1 trichloroethane, carbon tetrachloride and xylene. After drying the microspheres are then subjected to the following thermal treatment:

200°/hr up to 600° C. in an atmosphere of Argon plus 4% by volume of hydrogen, 350°/hr up to 1300° C. in atmosphere of Argon plus 4% by volume of CO. The temperature is then kept constant at 1300° C. The temperature then is brought back to 600° C. by cooling at 350° C./hr and subsequently in an atmosphere of argon and hydrogen, room temperature is reached, by cooling at 200° C. per hour.

The characteristic of the microspheres are:

|  | Drying in 1.1.1. trichloroethane | Drying in carbon tetrachloride | Drying in xylene |
| --- | --- | --- | --- |
| C/U | 4,9 | 4,9 | 4,9 |
| Density g/cc | 2,9 | 3,1 | 2,7 |
| mean tensile strength, Kg | 3,0 | 3,0 | 2,7 |

EXAMPLE 2

Microspheres of $UO_2 + 10$ C.

Preparation of a liter of starting solution. 200 cc. of 8% by weight aqueous ammonia are poured into beaker #1 and are maintained under stirring. A mixture of 200 cc of acrolein plus 200 cc of furfuryl alcohol prepared in beaker #2 is added slowly to beaker #1.

The addition of the mixture is carried out in such a way as not to exceed 90° C., because of the exothermic reaction which develops upon the addition. The stirring is continued until the temperature of the polymeric liquid obtained is decreased to about 60° C.

Beaker #1 is cooled in a bath of cold water. To beaker #1 at room temperature, under stirring, there is added by pouring a mixture of 200 cc of uranyl nitrate (565 g/l as $UO_2$), 200 cc of tetrahydrofurfuryl alcohol, 50 cc of water, and 100 cc of Methocel 90 HG 3% by weight separately prepared in beaker #3.

The solution is then ready and is fractionated into microspheres with suitable dripping devices in 32% by weight aqueous ammonia. The microspheres are aged for 2 hours in 32% by weight aqueous ammonia and subsequently washed with water.

Drying is effected by means of azeotropic distillation with organic liquids i.e., 1.1.1. trichloroethane, carbon tetrachloride and xylene. After drying, the microspheres are subjected to the following thermal treatment: 200°/hr up to 600° C. in an atmosphere of Argon plus 4% by volume of hydrogen, 350°/hr up to 1300° C. in an atmosphere of Argon, plus 4% by volume of carbon oxide. The temperature is then kept constant for two hours at 1300° C. It is then cooled to room temperature in a reciprocal stepwise manner to that followed in the heating steps.

The characteristics of the microspheres are:

|  | Drying in 1.1.1. trichloroethane | Drying in carbon tetrachloride | Drying in xylene |
| --- | --- | --- | --- |
| C/U | 9,6 | 7,6 | 9,6 |
| Density g/cc | 2,35 | 2,45 | 3,1 |
| tensile strength Kg. | 2,2 | 3,3 | 4,0 |

EXAMPLE 3

Microspheres of $UO_2 + 10$ C.

Preparation of 1 liter of starting solution.

200 cc of 8% by weight aqueous ammonia are poured into beaker #1 and are maintained under stirring.

A mixture of 200 cc of acrolein plus 200 cc furfuryl alcohol prepared in beaker #2 is slowly added to beaker #1. The mixture is poured slowly from beaker #2 into beaker #1 as described in Examples 1 and 2.

When the temperature of the polymeric liquid formed is at about 60° C., beaker #1 is cooled with a bath of cold water.

At room temperature, a mixture of 200 cc of uranyl nitrate (565 g/l as $UO_2$), 250 cc of tetrahydrofurfuryl alcohol, 100 cc. of water, prepared in beaker #3, is poured into beaker #1, with stirring.

The solution, so prepared, is left for about 10 hours at a temperature not higher than 18°–20° C.

The polymer contained in the solution continues to polymerize slowly. After 10 hours its viscosity is such that it may be fractionated in microspheres by means of dripping devices.

The mixture is then dripped into 32% by weight aqueous ammonia.

The microspheres are then aged for 2 hours in 32% by weight aqueous ammonia and subsequently washed in water.

Drying is carried out in a furnace at 100° C. by means of heating with electric resistances or with high frequency microwaves.

The microspheres which undergo these treatments then become dark red. Subsequently they undergo the following thermal treatment: 120°/hr up to 600° C. in an atmosphere of Argon plus 4% by volume of hydrogen, then the temperature is kept at 600° C., 350°/hr up to 1500° C. in an atmosphere of Argon plus 4% by volume of carbon oxide; afterwards the temperature is maintained constant at 1500° C. for 1 hour. Then they are cooled in the reverse manner to that of the heating steps.

The characteristics of the microspheres are:

|  | Drying in electric furnace | Drying with microwaves |
|---|---|---|
| C/U | 9,8 | 9,8 |
| density g/cc | 3,6 | 3,7 |
| tensile strength Kg. | 6,0 | 2,0 |

EXAMPLE 4

Microspheres of $UO_2 + 5\ C$.

Preparation of 1 liter of starting solution.

100 cc of 8% by weight aqueous ammonia are poured into beaker #1 and are maintained under stirring.

A mixture of 100 cc of acrolein plus 100 cc of furfuryl alcohol prepared in beaker #2 is added slowly to beaker #1 as described in Examples 1 and 2.

When the temperature of the polymeric liquid formed has decreased to about 60° C., beaker #1 is cooled with a bath of cold water.

When room temperature is reached in beaker #1, there is added by pouring while stirring, a mixture of 200 cc uranyl nitrate (565 g/l as $UO_2$), 375 cc of tetrahydrofurfuryl alcohol, and 200 cc of water, prepared in beaker #3.

The solution, so prepared, is left at a temperature not higher than 18°–20° C. for about 15 hours. The polymer contained in the solution continues to polymerize slowly. After 15 hours its viscosity is such that it may be fractionated into microspheres by means of a dripping device. It is dripped into 32% by weight aqueous ammonia. The microspheres are aged for 2 hours in 32% by weight of aqueous ammonia and subsequently washed with water. Drying is effected in a furnace heated with electrical resistances at 100° C.

Subsequently the microspheres are subjected to the following thermal treatment: 120°/hr up to 600° C. in an atmosphere of Argon plus 4% by volume of hydrogen, staying at 600° C. for an hour, 350° C./hr up to 1500° C. in atmosphere of argon plus 4% by volume of carbon oxide, staying at 1500° C. for an hour. The microspheres are then cooled in a reverse stepwise manner to that employed for the heating steps.

The characteristics of the microspheres are:

|  | Drying in electrical furnace |
|---|---|
| C/U | 4,8 |
| density g/cc | 4,1 |
| tensile strength Kg. | 2,0 |

EXAMPLE 5

Microspheres of $UO_2$.

A starting solution (1 liter) is prepared as follows: 100 cc of Methocel HG 90 3% by weight, 100 cc of acrolein, 200 cc of solution of uranyl nitrate (550 g/1 as $UO_2$) and 600 cc of water are mixed together. As soon as the mixture has been prepared, it is dripped into 32% by weight of aqueous ammonia. The formed microspheres are permitted to age for 2 hours in 32% by weight of aqueous ammonia, and are subsequently washed with water. Drying is effected by means of azeotropic distillation carbon tetrachloride. The microspheres are then subjected to the following thermal treatment: 200°/hr up to 500° C., 350°/hr up to 1400° C., staying at the temperature of 1400° C. for 2 hours and then cooled back to room temperature in a reverse stepwise manner.

The thermal cycling takes place in an atmosphere of argon plus 4% by volume of hydrogen.

The characteristics of microspheres are:

|  | Drying with carbon tetrachloride | |
|---|---|---|
| density g/cc | 10,82 | (98,63% as to the theoretical density) |
| tensile strength Kg. | 1,0 | |

EXAMPLE 6

Microspheres of $ThO_2 + 20\ C$.

Preparation of a liter of starting solution.

200 cc of 8% by weight of aqueous ammonia are poured into beaker #1 and are maintained under stirring.

A mixture of 200 cc of acrolein plus 200 cc of furfuryl alcohol is added to beaker #1 having been prepared in beaker #2. The addition of the mixture is carried out in such a manner as not to exceed 90° C., because of the exothermic reaction which develops.

The stirring is continued until the temperature of the polymeric liquid which is obtained decreases to about 60° C. Beaker #1 then is cooled with a bath of cold water. At room temperature, a mixture of 200 cc of thorium nitrate (330 g/1 as $ThO_2$), 200 cc of tetrahydrofurfuryl alcohol, 50 cc of water and 100 cc of Methocel 90 HG 3% by weight prepared in beaker #3, is poured into beaker #1 at room temperature.

The solution is permitted to age for 1 hour and then is dripped into 32% by weight of aqueous ammonia.

The formed microspheres, are permitted to age for two hours in 32% by weight of aqueous ammonia and subsequently are washed with water.

They are then dried by means of azeotropic distillation with carbon tetrachloride.

After drying, the microspheres are subjected to the following thermal treatment:

200°/hr up to 600° C. in an atmosphere of Argon plus 4% by volume of hydrogen, 350°/hr up to 1300° C. in an atmosphere of Argon plus the 4% by volume of carbon monoxide, remaining at the temperature of 1300° C. for two hours. The microspheres are then cooled back to room temperature in a reverse stepwise manner to that for the heating step.

The characteristics of the microspheres are:

|  | Drying with carbon tetrachloride |
|---|---|
| C/Th | 18,5 |
| density g/cc | 1,53 |

| -continued |
|---|
| Drying with carbon tetrachloride |
| tensile strength, Kg.    1,1 |

What we claim is:

1. A process for the production of carbon containing microspheres of thorium oxide, uranium oxide, plutonium oxide or mixtures thereof, said process comprising:
   (a) preparing a solution by mixing a salt of thorium, uranium or plutonium or a mixture thereof and an aqueous alkaline medium containing a polymerizable organic compound which is capable of forming a carbonizable polymer and if necessary an agent to make the polymerizable organic compound miscible with said aqueous alkaline medium;
   (b) forming microspheres by adding the mixture of steo (a) dripwise to an alkaline solution which is sufficiently alkaline whereby the salts precipitate and the polymerizable organic compound polymerizes;
   (c) washing the microspheres with water to remove foreign ions; and
   (d) heating the microspheres in an atmosphere which comprises hydrogen to carbonize the organic polymer and form the carbon containing microspheres of thorium oxide, uranium oxide, plutonium oxide or mixtures thereof.

2. A process as defined in claim 1 wherein the polymerizable organic compound is acrolein, acrylonitrile or a solution of styrene in benzene.

3. A process as defined in claim 1 wherein the uranium salt is uranyl nitrate, the organic compound is acrolein, and the alkaline solution employed in step (b) is aqueous ammonia.

4. In a process for the production of carbon containing microspheres of thorium oxide, uranium oxide, plutonium oxide or mictures thereof, said process comprising:
   (a) preparing a mixture from (1) salt of thorium, uranium or plutonium or a mixture thereof and (2) and aqueous alkaline medium;
   (b) forming microspheres by adding the mixture of step (a) dripwise to an alkaline solution to precipitate the salts of thorium uranium or plutonium;
   (c) washing microspheres with water to remove foreign ions; and
   (d) heating the microspheres in an atmosphere which comprises hydrogen to form carbon containing microspheres of thorium oxide, uranium oxide, plutonium oxide or mixtures thereof, the improvement which comprises including step (a) a polymerizable organic compound which is capable of forming a carbonizable polymer and if necessary an agent to make the polymerizable organic compound miscible with the aqueous alkaline medium.

5. A process for the production of carbon containing microspheres of uranium oxide, said process comprising:
   (a) preparing a mixture which comprises uranyl nitrate, 8% aqueous ammonia, acrolein and furfuryl alcohol;
   (b) forming microspheres by adding the mixture of (a) dripwise into 32% aqueous ammonia to precipitate the uranyl nitrate and polymerize the acrolein;
   (c) aging the microspheres of step (b) for 2 hours in 32% aqueous ammonia to complete the reaction of uranyl nitrate with ammonia to form ammonium diuranate;
   (d) washing the microspheres with water to remove the nitrate ions;
   (e) drying the microspheres; and
   (f) heating the microspheres in an atmosphere which comprises hydrogen, to carbonize the polymerized acrolein and form the carbon containing microspheres of uranium oxide.

* * * * *